(12) United States Patent
Lee et al.

(10) Patent No.: US 12,319,216 B2
(45) Date of Patent: Jun. 3, 2025

(54) MODULAR BUMPER BACK BEAM

(71) Applicants: Hyundai Motor Company, Seoul (KR); Kia Corporation, Seoul (KR)

(72) Inventors: Hong Heui Lee, Gyeonggi-do (KR); Chan Joo Moon, Gyeonggi-do (KR); Dong Eun Cha, Gyeonggi-do (KR); Jin Young Yoon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 316 days.

(21) Appl. No.: 17/973,801

(22) Filed: Oct. 26, 2022

(65) Prior Publication Data
US 2023/0406246 A1    Dec. 21, 2023

(30) Foreign Application Priority Data

Jun. 15, 2022  (KR) ................ 10-2022-0073097

(51) Int. Cl.
| | | |
|---|---|---|
| *B60R 19/18* | (2006.01) | |
| *B60R 19/02* | (2006.01) | |
| *B60R 19/04* | (2006.01) | |
| *B60R 19/12* | (2006.01) | |

(52) U.S. Cl.
CPC ............ *B60R 19/18* (2013.01); *B60R 19/023* (2013.01); *B60R 19/04* (2013.01); *B60R 19/12* (2013.01); *B60R 2019/1806* (2013.01)

(58) Field of Classification Search
CPC ....... B60R 19/18; B60R 19/023; B60R 19/04; B60R 19/14; B60R 19/24; B60R 19/34; B60R 19/52; B60R 2019/245; B60R 2019/1806; B60R 2019/522

USPC ............... 293/133, 149–152; 296/187.1
See application file for complete search history.

(56) References Cited

U.S. PATENT DOCUMENTS

| | | | |
|---|---|---|---|
| 3,907,352 A * | 9/1975 | Spain ................ | B60R 19/04 293/149 |
| 5,000,499 A * | 3/1991 | Shephard ........... | B60R 19/14 293/153 |
| 2006/0001278 A1 * | 1/2006 | Evans ................ | B60R 19/18 293/133 |
| 2012/0313398 A1 * | 12/2012 | Shin ................. | B62D 21/152 296/187.1 |
| 2017/0197572 A1 * | 7/2017 | Fabiano ............. | B60R 19/46 |
| 2017/0274849 A1 * | 9/2017 | Jordan .............. | B60R 19/24 |
| 2019/0168700 A1 | 6/2019 | Lattorff et al. | |
| 2019/0248313 A1 * | 8/2019 | Garbutt ............. | B60R 19/18 |
| 2021/0309172 A1 * | 10/2021 | Li .................. | B60R 19/04 |

FOREIGN PATENT DOCUMENTS

| | | |
|---|---|---|
| KR | 200154667 Y1 | 8/1999 |
| KR | 10-2023-0068662 A | 5/2023 |

* cited by examiner

*Primary Examiner* — Amy R Weisberg
*Assistant Examiner* — Denise Lynne Esquivel
(74) *Attorney, Agent, or Firm* — Fox Rothschild LLP

(57) ABSTRACT

Provided is a modular bumper back beam which secures crash performance, is changeable depending on the design of a mobility device through commonization of parts so as to easily cope with design and data required by the mobility device, and has a simple structure so as to be simplified in terms of management and assembly. Thereby, the modular bumper back beam is assembled and manufactured using the minimum number of molds through commonization of parts of the bumper back beam, thereby being capable of reducing manufacturing costs.

16 Claims, 10 Drawing Sheets

MODULAR BUMPER BACK BEAM

CROSS-REFERENCE TO RELATED APPLICATION

This application claims under 35 U.S.C. § 119(a) the benefit of Korean Patent Application No. 10-2022-0073097, filed on Jun. 15, 2022, in the Korean Intellectual Property Office, the disclosure of which is incorporated herein by reference in its entirety.

FIELD OF THE DISCLOSURE

Embodiments of the present disclosure relate to a modular bumper back beam, and more particularly, to a modular bumper back beam which secures crash performance, is changeable depending on the design of a mobility device through commonization of parts so as to easily cope with design and data required by the mobility device, and has a simple structure so as to be simplified in terms of management and assembly.

DESCRIPTION OF THE RELATED ART

In general, in order to absorb impact upon external collision or to reduce injuries to a pedestrian upon collision with the pedestrian, a bumper is provided at each of the front and rear ends of a vehicle.

Such a bumper includes a bumper cover and a bumper back beam. Concretely, the bumper cover is mounted at each of the frontmost and rearmost ends of the vehicle so as to form the exteriors of the front and rear parts of the vehicle, and impact transferred from the outside is first applied to the bumper cover. Such a bumper cover is filled with a cushioning material, so as to more easily absorb impact transferred from the outside.

The bumper back beam is provided inside the bumper cover so as to absorb the impact transferred through the bumper cover.

Here, when the bumper back beam is formed of steel, the weight thereof is increased, and, when the bumper back beam is formed of a fiber reinforced composite material, the strength and stiffness thereof are decreased Further, the bumper back beam is installed on a crash box, and has high energy absorption capacity in the event of a collision.

However, the bumper back beam and the crash box are conventionally used together, and thus, it is difficult to replace the bumper back beam.

That is, the bumper back beam is customized depending on a specific vehicle, the bumper back beam is not capable of being replaced in various kinds of vehicle.

Although technologies for vehicles are gradually developed, it is difficult to satisfy bumper back beams having various sizes and designs, and thus, a model for a new vehicle model always needs to be newly designed.

The above information disclosed in the Background section is only for enhancement of understanding of the background of the disclosure and should not be interpreted as conventional technology that is already known to those skilled in the art.

SUMMARY OF THE DISCLOSURE

Therefore, the present disclosure has been made in view of the above problems, and it is an object of the present disclosure to provide a modular bumper back beam which secures crash performance, is changeable depending on the design of a mobility device through commonization of parts so as to easily cope with design and data required by the mobility device, and has a simple structure so as to be simplified in terms of management and assembly.

In accordance with the present disclosure, the above and other objects can be accomplished by the provision of a modular bumper back beam including a first member configured to form a central part of the modular bumper back beam, and provided with first coupling parts at both ends of the first member, a second member configured to form one side part of the modular bumper back beam, disposed at one side of the first member, and provided with a second coupling part at one end of the second member facing the first member, a third member configured to form a remaining side part of the modular bumper back beam, disposed at a remaining side of the first member, and provided with a third coupling part at one end of the third member facing the first member, first links disposed between the first member and the second member, and connected to the first coupling part and the second coupling part so as to fix a connection position between the first member and the second member, and second links disposed between the first member and the third member, and connected to the first coupling part and the third coupling part so as to fix a connection position between the first member and the third member.

First mounting parts respectively mounted on the first coupling part and the second coupling part may be provided at both ends of the first links, and second mounting parts respectively mounted on the first coupling part and the third coupling part may be provided at both ends of the second links.

Rails configured to extend in a vertical direction may be respectively formed on the first coupling part of the first member and the second coupling part of the second member, and the first mounting parts provided at both ends of the first links may be connected to the first coupling part and the second coupling part so as to be slidable along the rails.

The first links may be completely fixed to the first member and the second member when fixing members pass through the first mounting part and the first coupling part and through the first mounting part and the second coupling part and are thus coupled thereto.

Rails configured to extend in a vertical direction may be respectively formed on the first coupling part of the first member and the third coupling part of the third member, and the second mounting parts provided at both ends of the second links may be connected to the first coupling part and the third coupling part so as to be slidable along the rails.

The second links may be completely fixed to the first member and the third member when fixing members pass through the second mounting part and the first coupling part and through the second mounting part and the third coupling part and are thus coupled thereto.

The first links may be configured to be rotatable in forward and rearward directions about the first mounting part provided at one end of each of the first links and the first mounting part provided at a remaining end of each of the first links, and the second links may be configured to be rotatable in the forward and rearward directions about the second mounting part provided at one end of each of the second links and the second mounting part provided at a remaining end of each of the second links.

The modular bumper back beam may further include a plurality of reinforcing parts detachably mounted on front surfaces of the first member, the second member and the third member.

Each of the reinforcing parts may include a pair of insertion ends inserted into a corresponding one of the first member, the second member and the third member, and a support configured to extend to be connected to the pair of insertion ends.

The reinforcing parts may be configured such that the supports are disposed in a vertical direction, and the reinforcing parts may be arranged horizontally on an entirety or a portion of a front surface of each of the first member, the second member and the third member.

The insertion ends may be hollow, both ends of the support may be movably inserted into hollows of the insertion ends, and a position of the support may be fixed when the fixing members pass through the insertion ends and the support and are thus coupled thereto.

Connectors may be provided on side parts of the supports of the respective reinforcing parts, and the respective reinforcing parts may be connected by connection bars connected to the connectors of different reinforcing parts.

The reinforcing parts may be formed to have specific shapes having areas within a range of an area of a front surface of each of the first member, the second member and the third member.

In another embodiment, vehicles are provided that comprise an apparatus as disclosed herein.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
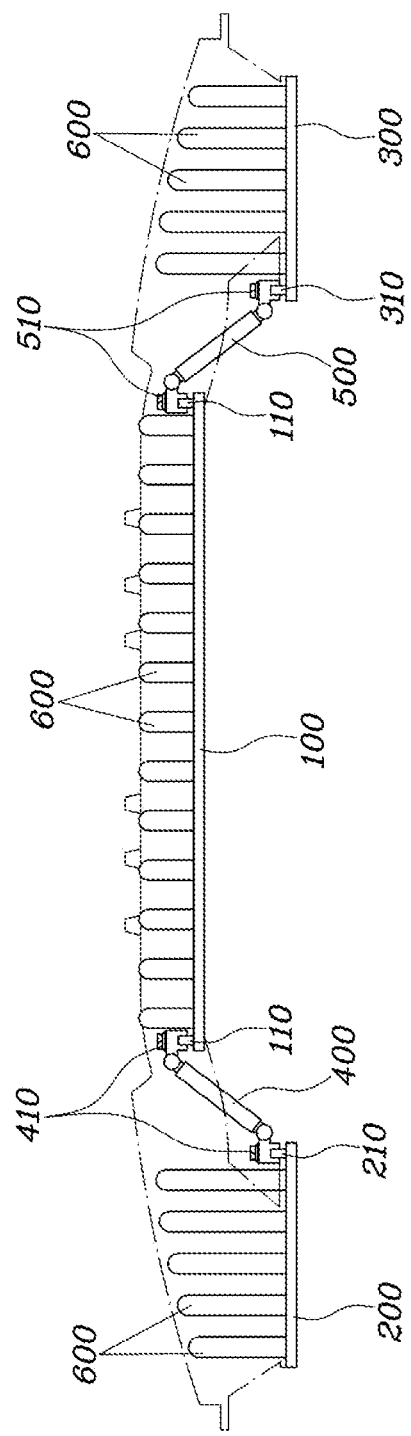
FIG. 1 is a view showing a modular bumper back beam according to the present disclosure.

Reference will now be made in detail to exemplary embodiments of the present disclosure, examples of which are illustrated in the accompanying drawings. Wherever possible, the same reference numbers will be used throughout the drawings to refer to the same or like parts.

In the following description of the embodiments, suffixes, such as "module", "part" and "unit", are provided or used interchangeably merely in consideration of ease in statement of the specification, and do not have meanings or functions distinguished from one another.

In the following description of the embodiments of the present disclosure, a detailed description of known functions and configurations incorporated herein will be omitted when it may make the subject matter of the present disclosure rather unclear. Further, the accompanying drawings will be exemplarily given to describe the embodiments of the present disclosure, and should not be construed as being limited to the embodiments set forth herein, and it will be understood that the embodiments of the present disclosure are provided only to completely disclose the disclosure and cover modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Figure 2:
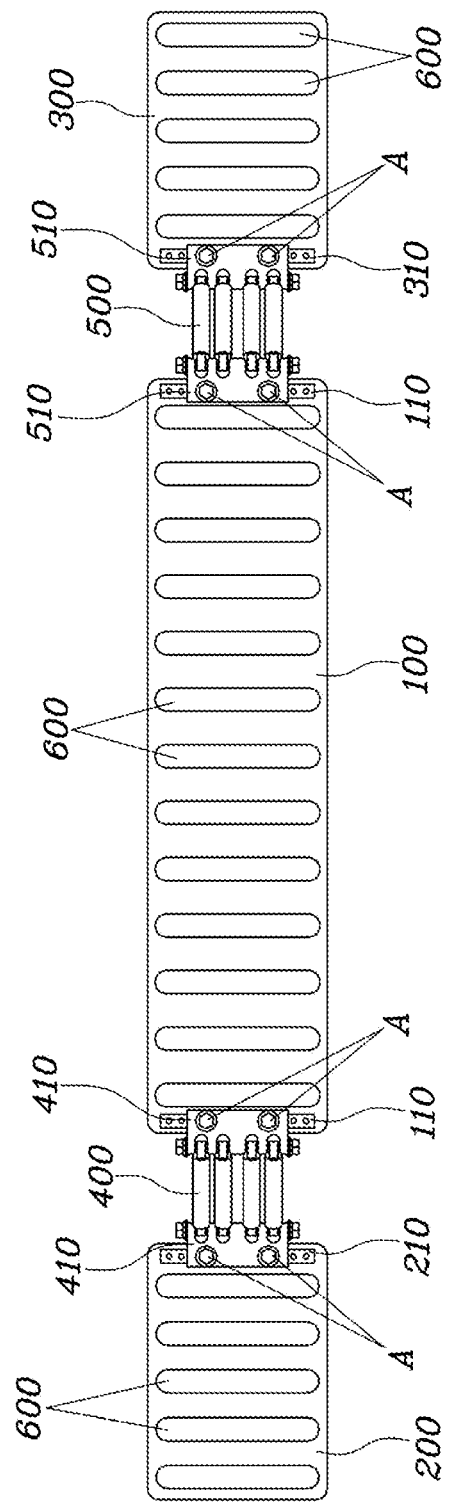
FIG. 2 is a front view of the modular bumper back beam shown in FIG. 1.

A modular back beam according to the present disclosure may include, as shown in FIGS. 1 and 2, a first member 100 configured to form the central part of the modular bumper back beam and provided with first coupling parts 110 at both ends of the first member 100, a second member 200 configured to form one side part of the modular bumper back beam, is disposed at one side of the first member 100, and provided with a second coupling part 210 at one end of the second member 200 facing the first member 100, a third member 300 configured to form the other side part of the modular bumper back beam, is disposed at the other side of the first member 100, and provided with a third coupling part 310 at one end of the third member 300 facing the first member 100, first links 400 disposed between the first member 100 and the second member 200 and connected to the first coupling part 110 and the second coupling part 210 so as to fix a connection position between the first member 100 and the second member 200, and second links 500 disposed between the first member 100 and the third member 300 and connected to the first coupling part 110 and the third coupling part 310 so as to fix a connection position between the first member 100 and the third member 300.

That is, the modular bumper back beam according to the present disclosure may include the first member 100, the second member 200 and the third member 300, and the first member 100 forms the central part of the modular bumper back beam and the second member 200 and the third member 300 located at both sides of the first member 100 form the side parts of the modular bumper back beam, thereby forming the whole shape of the bumper back beam.

Particularly, the second member 200 may be connected to the first member 100 by the first links 400 so that the positions of the first member 100 and the second member 200 relative to each other are fixed, and the third member 300 is connected to the first member 100 by the second links 500 so that the positions of the first member 100 and the third member 300 relative to each other are fixed. The first links 400 and the second links 500 may be provided in plural depending on connection stiffness between the respective members 100, 200 and 300, and the shape of the bumper back beam depending on the design and data of a mobility device may be satisfied by changing the length of the first links 400 and the second links 500 and the connection angles of the first links 400 and the second links 500. Further, crash stiffness which is required may be satisfied by changing the materials or thicknesses of the first member 100, the second member 200 and the third member 300.

Therefore, in the present disclosure, the shape of the bumper back beam depending on the design and data of a corresponding one of various mobility devices may be satisfied by providing the first member 100, the second member 200 and the third member 300 as commonization parts and varying the lengths, the angles, etc. of the first links 400 and the second links 500. Thereby, the modular bumper back beam of the present disclosure secures crash performance, is changeable depending on the design of a mobility device through commonization of parts so as to easily cope with design and data required by the mobility device, and has a simple structure so as to be simplified in terms of management and assembly.

Concretely, in the present disclosure, first mounting parts 410 respectively mounted on the first coupling part 110 and the second coupling part 210 may be provided at both ends of the first links 400, and second mounting parts 510 respectively mounted on the first coupling part 110 and the third coupling part 310 may be provided at both ends of the second links 500.

In the present disclosure, the first links 400 and the second links 500 may be provided in the form of a pipe. Further, in order to mount the first links 400 and the second links 500 on the first member 100, the second member 200 and the third member 300, the first mounting parts 410 are provided at the first links 400, and the second mounting parts 510 are provided at the second links 500.

The first mounting parts 410 and the second mounting parts 510 may be provided to be placed on the first coupling part 110 of the first member 100 and the second coupling part 210 of the second member 200 and on the first coupling part 110 of the first member 100 and the third coupling part 310 of the third member 300, and may be fixedly mounted on the respective members 100, 200 and 300 by fixing members A, such as bolts, in the state in which the first mounting parts 410 and the second mounting parts 510 are placed on the respective members 100, 200 and 300. When the first mounting parts 410 and the second mounting parts 510 are coupled to the respective members 100, 200 and 300, various coupling methods including insert-type coupling in addition to bolt coupling may be applied, but bolt coupling may be preferably used so as to secure coupling stiffness.

Rails extending in the vertical direction may be respectively provided on the first coupling part 110 of the first member 100 and the second coupling part 210 of the second member 200. As such, the rails extending in the vertical direction are provided on the first coupling part 110 and the second coupling part 210, and thus, the first mounting parts 410 provided at the first links 400 are slidably moved in the state in which the first mounting parts 410 are temporarily fixed to the rails, thereby being capable of changing the connection position between the first member 100 and the second member 200.

Figure 3:
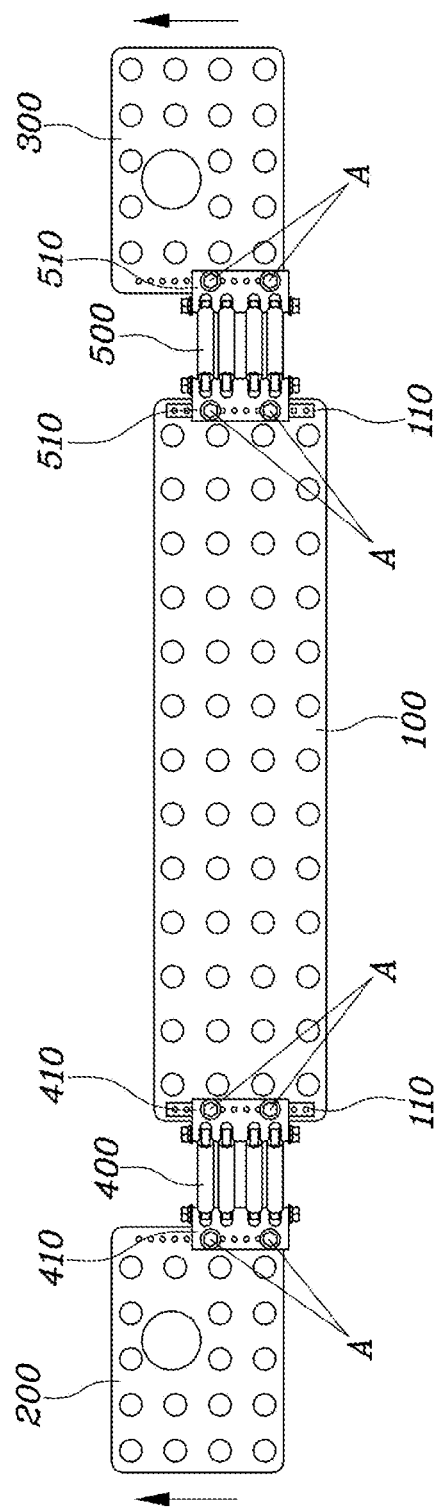
FIG. 3 is a view showing one embodiment in which the position of a second member relative to a first member is adjusted in the vertical direction in the modular back beam shown in FIG. 1.

That is, as shown in FIG. 3, the first mounting parts 410 provided at one end and the other end of each of the first links 400 may be connected to the first coupling part 110 and the second coupling part 210 so as to be slidable along the rails on the first coupling part 110 and the second coupling part 210, and thereby, the position of the first member 100 or the second member 200 may be moved in the vertical direction by the first links 400. By adjusting the position of the second member 200 in the vertical direction based on the first member 100, in this way, the modular bumper back beam may satisfy the design of the corresponding mobility device.

Further, the first links 400 may be completely fixed to the first member 100 and the second member 200 when the fixing members A pass through the first mounting part 410 and the first coupling part 110 and through the first mounting part 410 and the second coupling part 210 and are thus coupled thereto. Here, the fixing members A may be provided as bolts.

That is, in the state in which the first mounting parts 410 provided at both ends of the first links 400 are temporarily fixed to the first coupling part 110 and the second coupling part 210 so as to be movable, when the coupling members A are inserted into one of the first mounting parts 410 and the first coupling part 110, the first links 400 are fixed to the first member 100, and, when the coupling members A are inserted into the other one of the first mounting parts 410 and the second coupling part 210, the first links 400 are fixed to the second member 200. As such, the first member 100 and the second member 200 are connected to each other by the first links 400 such that the first links 400 are slidable on the first member 100 and the second member 200, and thus, it is easy to change the position of the first member 100 or the second member 200, and the first member 100 and the second member 200 may be fixed by the first links 400 by completely fixing the first links 400 through the fixing members A.

Further, rails extending in the vertical direction may be respectively provided on the first coupling part 110 of the first member 100 and the third coupling part 310 of the third member 300, and the second mounting parts 510 provided at one end and the other end of each of the second links 500 may be connected to the first coupling part 110 and the third coupling part 310 so as to be slidable along the rails on the first coupling part 110 and the third coupling part 310.

As such, the rails extending in the vertical direction may be provided on the first coupling part 110 and the third coupling part 310, and thus, the first mounting parts 410 of the second links 500 may be slidably moved in the state in which the second mounting parts 510 are temporarily fixed to the rails, thereby being capable of changing the connection position between the first member 100 and the third member 300.

That is, as shown in FIG. 3, the second mounting parts 510 provided at one end and the other end of each of the second links 500 may be connected to the first coupling part 110 and the third coupling part 310 so as to be slidable along the rails on the first coupling part 110 and the third coupling part 310, and thereby, the position of the first member 100 or the third member 300 may be moved in the vertical direction by the second links 500. By adjusting the position of the third member 300 in the vertical direction based on the first member 100, in this way, the bumper back beam may satisfy the design of the corresponding mobility device.

Further, the second links 500 may be completely fixed to the first member 100 and the third member 300 when the fixing members A pass through the second mounting part 510 and the first coupling part 110 and through the second mounting part 510 and the third coupling part 310 and are thus coupled thereto.

That is, in the state in which the second mounting parts 510 provided at both ends of the second links 500 are temporarily fixed to the first coupling part 110 and the third coupling part 310 so as to be movable, when the coupling members A are inserted into one of the second mounting parts 510 and the first coupling part 110, the second links 500 may be fixed to the first member 100, and, when the coupling members A are inserted into the other one of the second mounting parts 510 and the third coupling part 310, the second links 500 may be fixed to the third member 300. As such, the first member 100 and the third member 300 are connected to each other by the second links 500 such that the second links 500 are slidable on the first member 100 and the third member 300, and thus, it is easy to change the position of the first member 100 or the third member 300, and the first member 100 and the third member 300 may be fixed by the second links 500 by completely fixing the second links 500 through the fixing members A.

As such, in the present disclosure, the positions of the second member 200 and the third member 300 may be adjusted in the vertical direction based on the first member 100, and may be complexly fixed through the fixing members A in the state in which the positions of the second member 200 and the third member 300 have been adjusted.

The first links 400 may be configured to be rotatable in the forward and rearward directions about the first mounting part 410 provided at one end of each of the first links 400 and the first mounting part 410 provided at the other end of each of the first links 400, and the second links 500 may be configured to be rotatable in the forward and rearward directions about the second mounting part 510 provided at one end of each of the second links 500 and the second mounting part 510 provided at the other end of each of the second links 500.

The first mounting parts 410 may be provided at one end and the other end of each of the first links 400, and may be connected to the first links 400 such that the first links 400 are rotatable in the forward and rearward directions, and thus, the positions of the first links 400 may be changed in the forward and rearward directions in the state in which the first links 400 are connected to the first member 100 or the second member 200

In the same manner, the second mounting parts 510 may be provided at one end and the other end of each of the second links 500, and may be connected to the second links 500 such that the second links 500 are rotatable in the forward and rearward directions, and thus, the positions of the second links 500 may be changed in the forward and rearward directions in the state in which the second links 500 are connected to the first member 100 or the third member 300.

Figure 4:
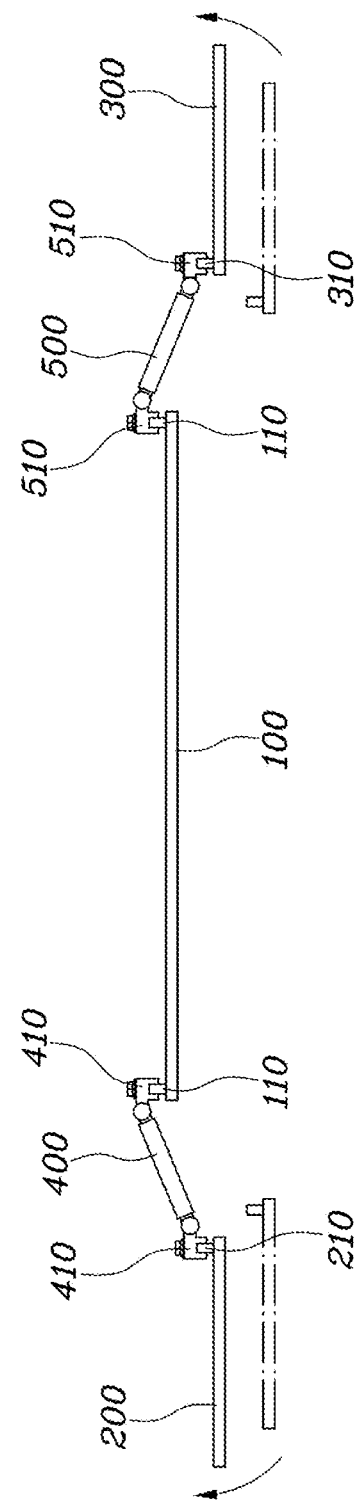
FIG. 4 is a view showing another embodiment in which the installation angles of a first link and a second link are adjusted in the modular back beam shown in FIG. 1.
Figure 5:
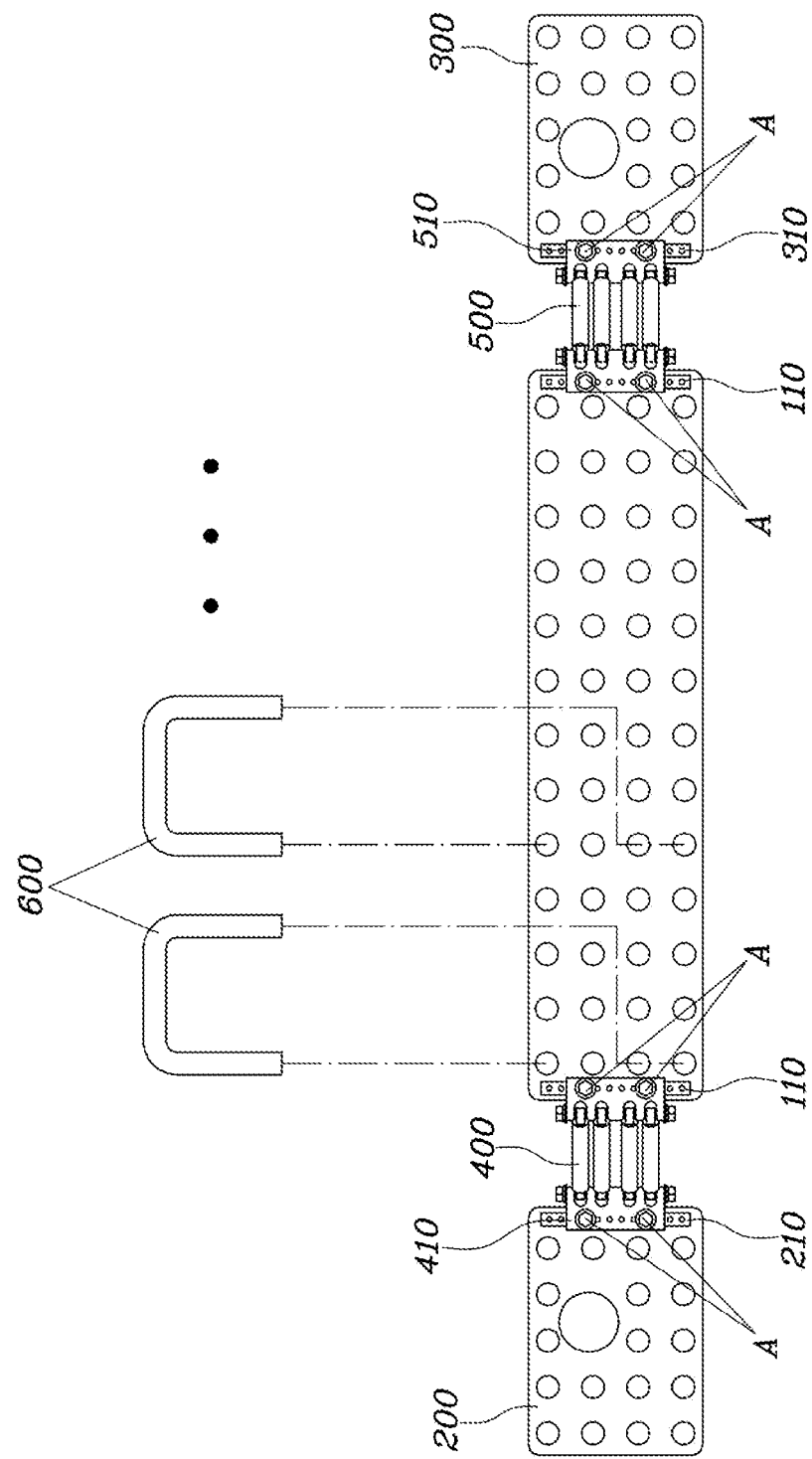
FIG. 5 is a view showing one embodiment of a reinforcing part in the modular back beam shown in FIG. 1.

Thereby, as shown in FIG. 4, the installation angle of the first links 400 and the second links 500 may be adjusted through rotation of the first links 400 and the second links 500 about the first member 100, and thus, the positions of the second member 200 and the third member 300 may be changed. In addition to adjustment of the positions of the second member 200 and the third member 300 about the first member 100 in the forward and rearward directions, the length of the first links 400 and the second links 500 may be changed so as to satisfy the design of the corresponding mobility device.

As described above, the bumper back beam according to the present disclosure may include the first member 100, the second member 200 and the third member 300, the second member 200 and the third member 300 may be connected to the first member 100 by the first links 400 and the second links 500, and the positions of the first member 100, the second member 200 and the third member 300 may be changed by the first links 400 and the second links 500, thereby being capable of coping with design and data required by the mobility device. Further, the first member 100, the second member 200 and the third member 300 are designated as commonization parts, and thereby, management and assembly of these parts are simplified, and manufacturing costs of the bumper back beam are reduced.

The bumper back beam according to the present disclosure may further include, as shown in FIGS. 1 to 5, a plurality of reinforcing parts 600 detachably mounted on the front surfaces of the first member 100, the second member 200 and the third member 300.

These reinforcing parts 600 serve to satisfy crash stiffness required by the bumper back beam, and are mounted on the front surface of the first member 100, the second member 200 and the third member 300 so as to increase stiffness of the respective members 100, 200 and 300. The reinforcing parts 600 may be provided in plural, and may be detachably mounted on the front surface of each of the respective members 100, 200 and 300, and the number and the positions of the installed reinforcing parts 600 may be determined depending on stiffness required by the overall bumper back beam. Further, the reinforcing parts 600 may be formed to have a different structure depending on the overall shape of the bumper back beam so as to cope with the design of the bumper back beam depending on the design of the mobility device.

In more detail, one embodiment of the reinforcing part 600 may include a pair of insertion ends 610 inserted into each of the respective members 100, 200 and 300, and a support 620 configured to extend to be connected to the pair of insertion ends 610.

That is, the reinforcing part 600 may be formed to have an inverted U-shape due to the pair of insertion ends 610 and the support 620 configured to connect the insertion ends 60. Thereby, the insertion ends 610 may be inserted into each of the respective members 100, 200 and 300 so as to secure coupling stiffness, and the support 620 connected to the insertion ends 610 may secure crash stiffness.

The bumper back beam according to the present disclosure may cope with the design of a bumper by changing the length of the insertion ends 610 or the supports 620 of the reinforcing parts 600, and may satisfy required stiffness by changing the thickness of the insertion ends 610 and the supports 620 of the reinforcing parts 600.

The reinforcing parts 600 may be configured such that the supports 620 are disposed in the vertical direction, and the reinforcing parts 600 may be arranged horizontally on the entirety or a portion of the front surface of each of the members 100, 200 and 300.

As shown in FIG. 2, the reinforcing parts 600 configured such that the supports 620 may be disposed in the vertical direction, and thus, it is easy to mount the respective reinforcing parts 600 on each of the respective members 100, 200 and 300 so as to cope with the design of the bumper. Further, the reinforcing parts 600 may be arranged horizontally so as to secure support force in the event of collision occurring on the bumper. Here, the number and the positions of the installed reinforcing parts 600 may be determined depending on the range of protection of each of the members 100, 200 and 300 against collision based on the design of the mobility device, and the distance between the respective reinforcing parts 600 in each of the members 100, 200 and 300 may be determined depending on required crash stiffness.

Figure 6:
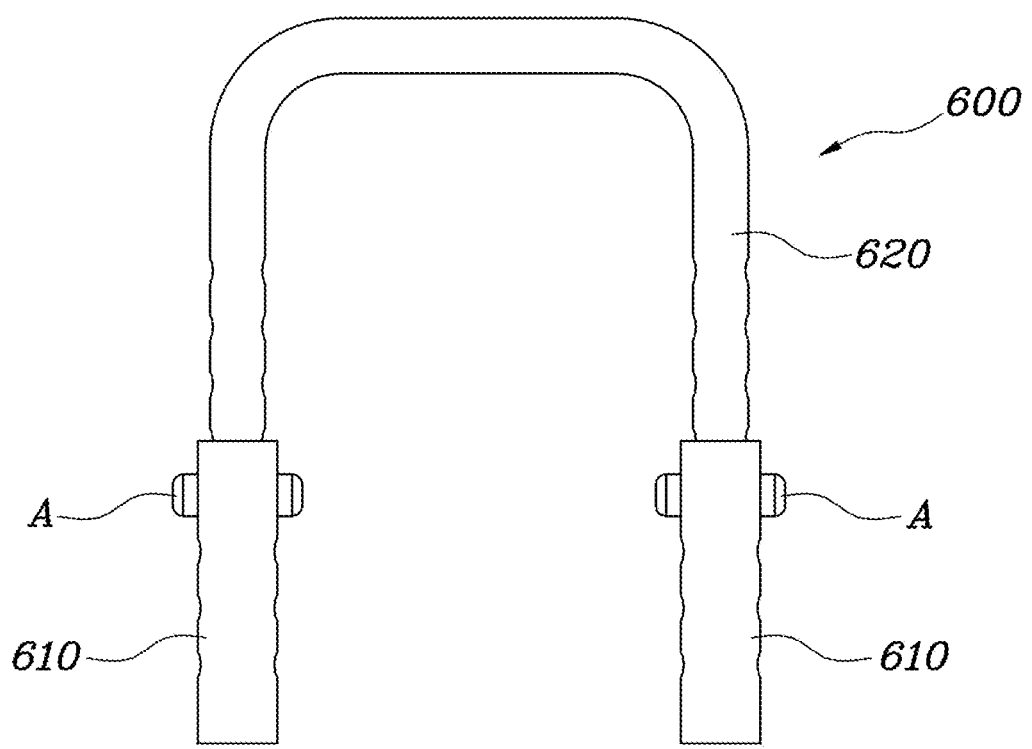
FIGS. 6 and 7 are views showing another embodiment of the reinforcing part in the modular back beam shown in FIG. 1.
Figure 7:
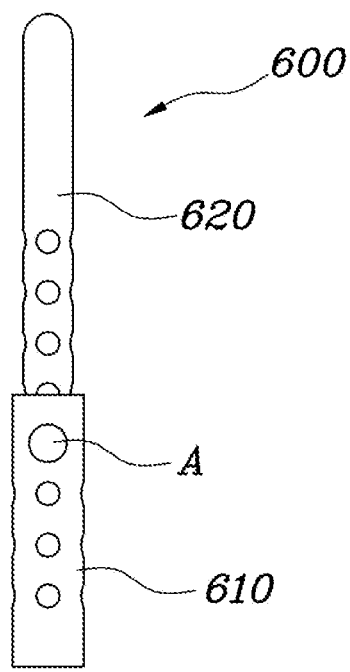

In another embodiment of the reinforcing part 600, as shown in FIGS. 6 and 7, the insertion ends 610 may be hollow, both ends of the support 620 may be movably inserted into the hollows of the insertion ends 610, and the position of the support 620 may be fixed when the fixing members A pass through the insertion ends 610 and the support 620 and are thus coupled thereto.

The reinforcing part 600 may be configured such that the length thereof may be changed by allowing the ends of the support 620 to be slidably moved in the insertion ends 610. That is, the reinforcing part 600 may have a short length when the ends of the support 620 are inserted into the hollows of the insertion ends 610, and may have a long length when the ends of the support 620 are moved in a direction of being withdrawn from the hollows of the insertion ends 610. As such, the length of the reinforcing part 600 may be adjusted by moving both ends of the support 620 in the insertion ends 610, and then, the length of the reinforcing part 600 may be determined by fixing the support 620 to the insertion ends 610 using the fixing members A.

In this manner, the reinforcing part 600 may be configured such that the length thereof may be changed by moving both ends of the support 620 in the insertion ends 610, thereby being capable of easily coping with the design of the bumper based on the design of the mobility device. Further, the bumper back beam according to the present disclosure may cope with the design of the bumper using the common reinforcing parts 600 without needing to manufacture reinforcing parts having various shapes so as to cope with the design of a specific bumper.

Further, in yet another embodiment of the reinforcing part 600, connectors 621 may be provided on the side parts of the supports 620 of the respective reinforcing parts 600, and the respective reinforcing parts 600 may be connected by connection bars 700 connected to the connectors 621 of different reinforcing parts 600.

Figure 8:
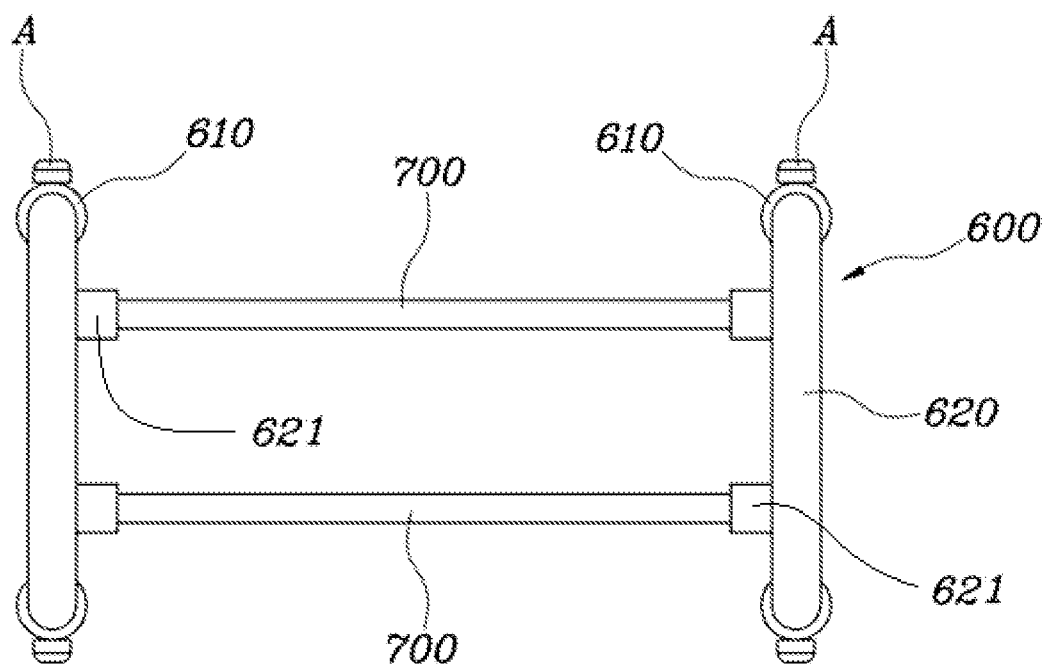
FIG. 8 is a view showing yet another embodiment of the reinforcing part in the modular back beam shown in FIG. 1.

As shown in FIG. 8, a plurality of the reinforcing parts 600 may be connected to each other by the connection bars 700, and thereby, stiffness of the entirety of the reinforcing parts 600 may be secured. For this purpose, the connectors 621 may be formed on the side parts of the supports 620 of the reinforcing parts 600, recesses may be formed in the connectors 621 so that the connection bars 700 are inserted into the recesses, and the connection bars 700 may be fixedly inserted into the connectors 621 through the recesses. Here, the connectors 621 may be provided on one side part or both side parts of the support 720, and the connection bars 700 may be configured to have different lengths depending on the distances between the respective reinforcing parts 600, or may be configured to have a variable length.

A plurality of the reinforcing parts 600 may be connected by these connection bars 700, and thus, in addition to securement of stiffness of the reinforcing parts 600, stiffness of the respective members 100, 200 and 300 may be increased, and crash performance of the bumper back beam may be secured.

Figure 9:
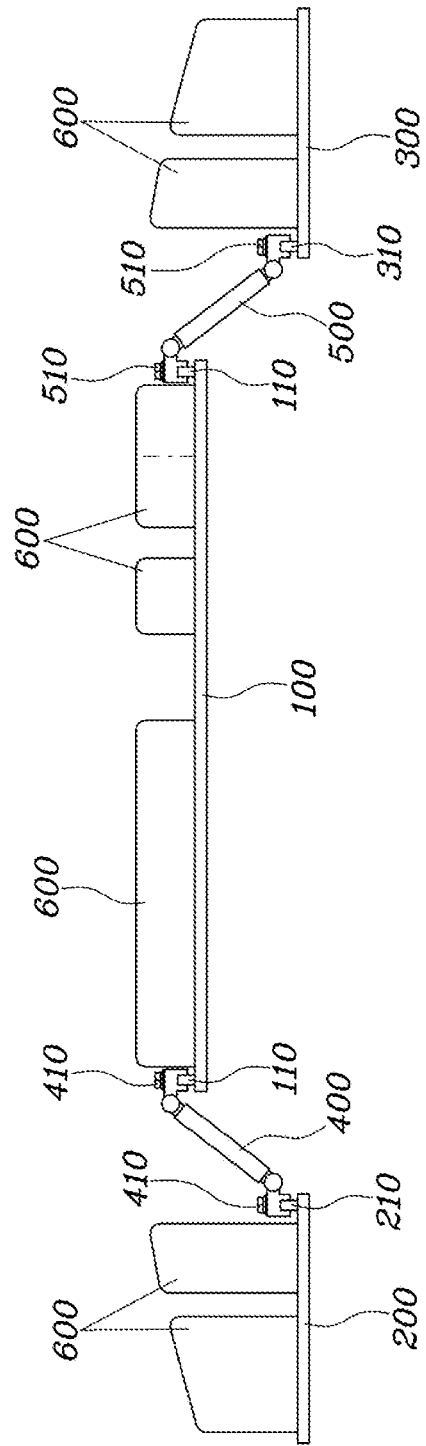
FIGS. 9 and 10 are views showing still another embodiment of the reinforcing part in the modular back beam shown in FIG. 1.
Figure 10:
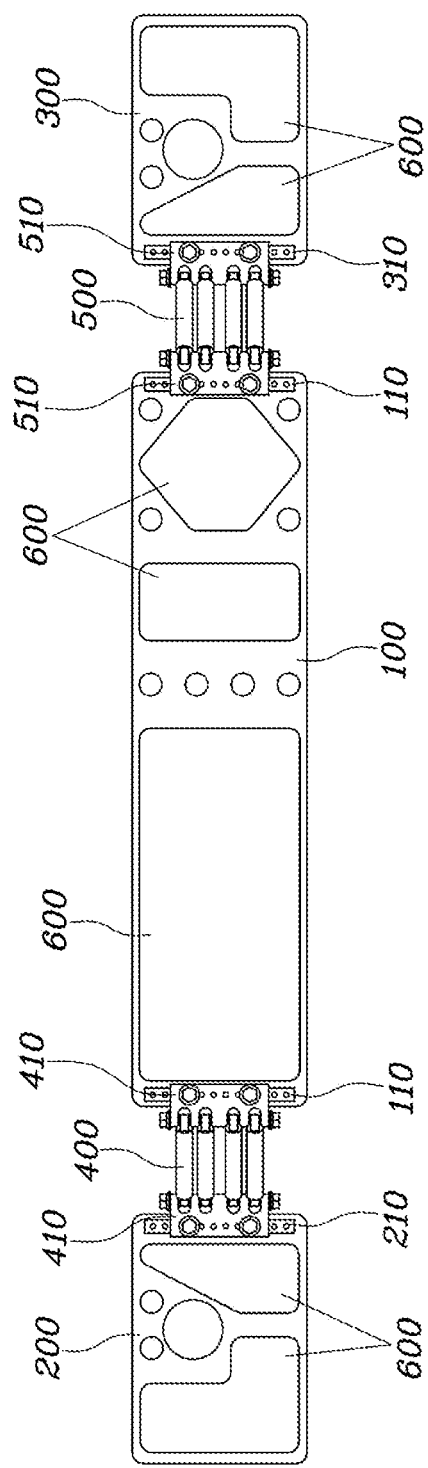

Moreover, as shown in FIGS. 9 and 10, the reinforcing parts 600 may be formed to have specific shapes having areas within the range of the area of the front surface of each of the respective members 100, 200 and 300. Thereby, the reinforcing parts 600 may locally secure crash stiffness of the bumper back beam depending on crash stiffness required based on the shape of the mobility device. These reinforcing parts 600 may be formed to have areas within the range of the area of the front surface of each of the respective members 100, 200 and 300, and thus, the reinforcing parts 600 together with the respective members 100, 200 and 300 may secure support stiffness against collision.

As described above, the reinforcing parts 600 may be formed to have shapes which satisfy crash stiffness and design required depending on the design of the mobility device, and are mounted on the first, second and third members 100, 200 and 300, and thereby, a bumper back beam satisfying the design of the mobility device may be provided.

The modular bumper back beam having the above-described structure according to the present disclosure may secure crash performance, be changeable depending on the design of a mobility device through commonization of parts so as to easily cope with design and data required by the mobility device, and have a simple structure so as to be simplified in terms of management and assembly.

Thereby, the modular bumper back beam according to the present disclosure may be assembled and manufactured using the minimum number of molds through commonization of parts of the bumper back beam, thereby being capable of reducing manufacturing costs.

As is apparent from the above description, a modular bumper back beam having the above-described structure according to the present disclosure may secure crash performance, be changeable depending on the design of a mobility device through commonization of parts so as to easily cope with design and data required by the mobility device, and have a simple structure so as to be simplified in terms of management and assembly.

Thereby, the modular bumper back beam according to the present disclosure may be assembled and manufactured using the minimum number of molds through commonization of parts of the bumper back beam, thereby being capable of reducing manufacturing costs.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A modular bumper back beam comprising:
   a first member configured to form a central part of the modular bumper back beam, and provided with first coupling parts at both ends of the first member;
   a second member configured to form one side part of the modular bumper back beam, disposed at one side of the first member, and provided with a second coupling part at one end of the second member facing the first member;
   a third member configured to form a remaining side part of the modular bumper back beam, disposed at a remaining side of the first member, and provided with a third coupling part at one end of the third member facing the first member;
   first links disposed between the first member and the second member, and connected to the first coupling part and the second coupling part so as to fix a connection position between the first member and the second member; and
   second links disposed between the first member and the third member, and connected to the first coupling part and the third coupling part so as to fix a connection position between the first member and the third member;
   wherein the positions of the first member the second member are movable in the vertical direction by the first links; and
   wherein the positions of the first member and the third member are movable in the vertical direction by the second links.

2. The modular bumper back beam according to claim 1, wherein:
   first mounting parts respectively mounted on the first coupling part and the second coupling part are provided at both ends of the first links; and
   second mounting parts respectively mounted on the first coupling part and the third coupling part are provided at both ends of the second links.

3. The modular bumper back beam according to claim 2, wherein rails configured to extend in a vertical direction are respectively formed on the first coupling part of the first member and the second coupling part of the second member.

4. The modular bumper back beam according to claim 3, wherein the first mounting parts provided at both ends of the first links are connected to the first coupling part and the second coupling part so as to be slidable along the rails.

5. The modular bumper back beam according to claim 4, wherein the first links are completely fixed to the first member and the second member when fixing members pass through the first mounting part and the first coupling part and through the first mounting part and the second coupling part and are thus coupled thereto.

6. The modular bumper back beam according to claim 2, wherein rails configured to extend in a vertical direction are respectively formed on the first coupling part of the first member and the third coupling part of the third member.

7. The modular bumper back beam according to claim 6, wherein the second mounting parts provided at both ends of the second links are connected to the first coupling part and the third coupling part so as to be slidable along the rails.

8. The modular bumper back beam according to claim 7, wherein the second links are completely fixed to the first member and the third member when fixing members pass through the second mounting part and the first coupling part and through the second mounting part and the third coupling part and are thus coupled thereto.

9. The modular bumper back beam according to claim 2, wherein:
   the first links are configured to be rotatable in forward and rearward directions about the first mounting part provided at one end of each of the first links and the first mounting part provided at a remaining end of each of the first links; and
   the second links are configured to be rotatable in the forward and rearward directions about the second mounting part provided at one end of each of the second links and the second mounting part provided at a remaining end of each of the second links.

10. The modular bumper back beam according to claim 1, further comprising a plurality of reinforcing parts detachably mounted on front surfaces of the first member, the second member and the third member.

11. The modular bumper back beam according to claim 10, wherein each of the reinforcing parts comprises a pair of insertion ends inserted into a corresponding one of the first member, the second member and the third member, and a support configured to extend to be connected to the pair of insertion ends.

12. The modular bumper back beam according to claim 11, wherein the reinforcing parts are configured such that the supports are disposed in a vertical direction, and the reinforcing parts are arranged horizontally on an entirety or a portion of a front surface of each of the first member, the second member and the third member.

13. The modular bumper back beam according to claim 11, wherein the insertion ends are hollow, both ends of the support are movably inserted into hollows of the insertion ends, and a position of the support is fixed when the fixing members pass through the insertion ends and the support and are thus coupled thereto.

14. The modular bumper back beam according to claim 11, wherein connectors are provided on side parts of the supports of the respective reinforcing parts, and the respective reinforcing parts are connected by connection bars connected to the connectors of different reinforcing parts.

15. The modular bumper back beam according to claim 10, wherein the reinforcing parts are formed to have specific shapes having areas within a range of an area of a front surface of each of the first member, the second member and the third member.

16. A vehicle comprising the modular bumper back beam according to claim 1.

\* \* \* \* \*